Dec. 20, 1949     F. J. RAYBOULD     2,492,006
PRESSURE CYLINDER
Filed May 17, 1945
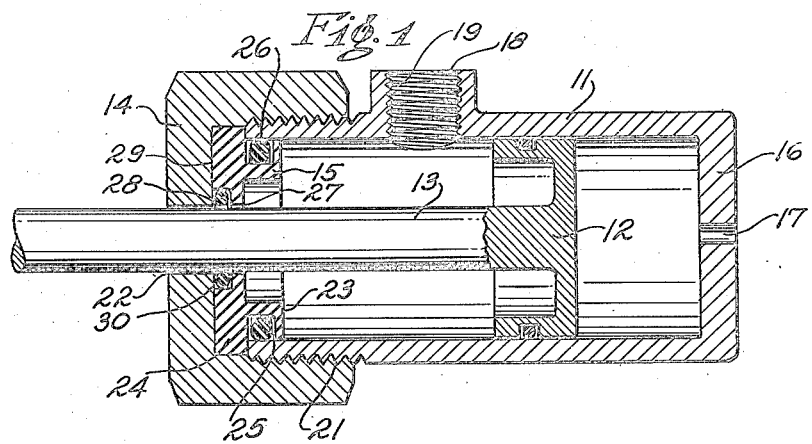
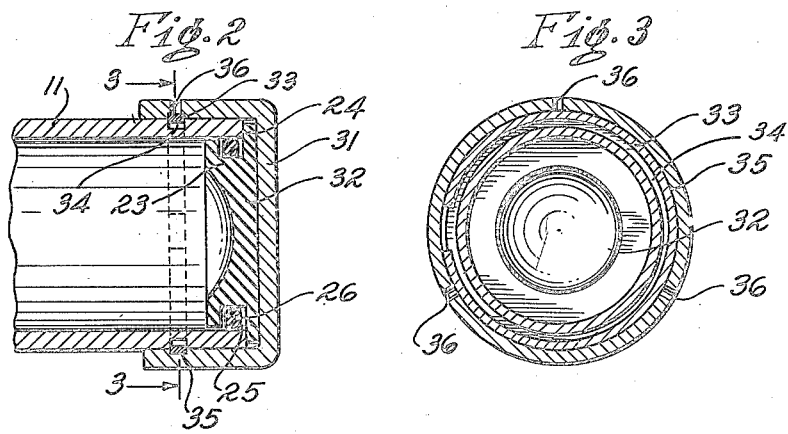
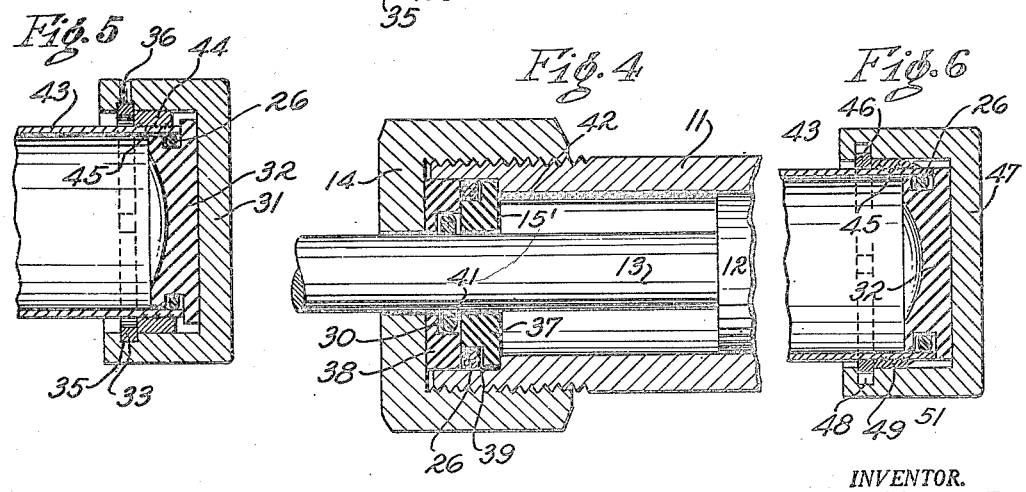
INVENTOR.
FRANK J. RAYBOULD
BY Richey & Watts
ATTORNEYS Patented Dec. 20, 1949

2,492,006

UNITED STATES PATENT OFFICE 2,492,006

PRESSURE CYLINDER

Frank J. Raybould, Lakewood, Ohio, assignor to The Weatherhead Company, Cleveland, Ohio, a corporation of Ohio Application May 17, 1945, Serial No. 594,286

8 Claims. (Cl. 309—2)

My invention relates to closures and seals. It concerns particularly arrangements for closing cylinders and tubes such as may be employed as operators or the like in connection with hydraulic and pneumatic equipment.

An object of my invention is to provide a pressure-tight joint at the end of a cylinder, such as between a cylinder and a closing cap.

A further object of my invention is to provide a pressure-tight joint both internally and externally such as between a gasket and a piston rod, and between a cylinder head and the inner surface of the cylinder.

A further object of my invention is to eliminate any need for gasket grooving in the cylinder, in a closure nut, or in a cap.

A further object of my invention is to provide a gasket cage either for gasketing the internal surface of a cylinder or for gasketing both the internal surface of the cylinder and the space around a piston rod.

A further object of the invention is to provide improved means for closing the ends of high-pressure cylinders and securing end caps thereto.

Still another object of my invention is to provide a threadless end cap.

A further object of the invention is to provide an end cap and securing arrangement therefor suitable for seamless, thin-wall tubing.

A further object is to provide means for closing the ends of tubes and cylinders too thin to permit the formation of threads or grooves. An object of my invention is to provide a spring-ring locking means for tubes and cylinders too thin to permit the formation of a ring-receiving groove.

A more specific object of my invention is to provide a locking-ring and a fixed shoulder lock for thin-wall tubes and cylinders.

In carrying out the invention in one of its preferred forms as in closing the end of a cylinder or tube such as the cylinder of a hydraulic actuator, for example, a gasket cage is employed for sealing the end of the cylinder in order to avoid the necessity for grooving the cylinder or cap to receive a gasket.

When sealing the end of a cylinder through which a piston rod passes, preferably a double-gasket cage is employed for making both a seal with the inner surface of the cylinder and with the piston rod. Where thin-walled tubing is used for forming the cylinder, preferably such means are provided for securing the cylinder cap to the cylinder as to avoid the necessity for either threading or grooving the cylinder, so that there is no weakening of the cylinder wall and the necessity for fastening an end cap to the cylinder does not limit the thinness of tube stock which may be employed. Preferably to this end a spring-ring fastening arrangement is employed. To avoid the necessity for grooving the thin-walled cylinder, a fixed shoulder lock is formed at the end of the cylinder by brazing or welding a ring thereto forming a fixed shoulder against which a spring-ring or locking-ring may bear.

A better understanding of the invention will be afforded by the following detailed description considered in conjunction with the accompanying drawing. Various features of the invention which are believed to be novel and patentable will be pointed out in the claims appended hereto.

In the drawing:

Fig. 1 is a longitudinal medial section of a hydraulic-operator cylinder and piston, employing a sealing arrangement in accordance with an embodiment of my invention;

Fig. 2 is a fragmentary view of a closing and sealing arrangement for the end of a cylinder employing a split-ring fastener construction;

Fig. 3 is a cross-sectional view of the arrangement of Fig. 2, represented as taken along the section 3—3 indicated in Fig. 2;

Fig. 4 is a fragmentary longitudinal sectional view of a sealing arrangement for the end of a cylinder and a piston rod employing a two-part gasket cage;

Fig. 5 is a fragmentary longitudinal sectional view of the end of the cylinder employing a cap fastening and sealing arrangement for a thin-walled cylinder, avoiding grooving of the cylinder and using a spring-ring construction; and Fig. 6 is a modification of the arrangement of Fig. 5.

The hydraulic operator unit shown by way of illustration in Fig. 1, comprises a cylinder 11, a piston 12 adapted to reciprocate within the cylinder 11, a piston rod 13 secured to or formed integral with the piston 12, a closure cap or nut 14 for closing the end of the cylinder 11, through which the piston rod 13 passes, and a gasket cage 15 for sealing the surfaces within the end of the cylinder 11, and around the piston rod 13 where it passes through the cap 14.

The cylinder 11 comprises a metallic casting having an open end for the piston rod 13 and a closed end 16 with a relief opening 17. There is a boss 18 with a threaded opening 19 for connecting the interior of the cylinder 11 between the piston 12 and the cap 14 to a source of fluid for applying hydraulic pressure to the piston 12, or for having pressure applied thereto by movement of the piston 12.

The open end of the cylinder 11 is threaded around the external surface as shown at 21 and the corresponding inner-surface of the cap 14 is likewise threaded to enable the cap 14 to be screwed upon the cylinder 11. There is an opening 22 in the cap 14 for permitting the piston rod 13 to pass through and to travel back and forth longitudinally with respect to the cylinder 11.

The gasket cage 15 has a portion 23 of a suitable diameter to fit loosely within the cylinder 11, and a portion 24 of such diameter as to fit against the end of the cylinder 11, and to fit within the cap 14. The arrangement is such that the gasket cage 15 may be secured against the end of the cylinder 11 by tightening the nut or cap 14 along the threads 21. The smaller diameter portion 23 of the gasket cage 15, has an annular groove 25 therein adapted to receive a gasket 26, for sealing the gasket cage 15 to the inner-surface of the cylinder 11.

An opening 27 is provided in the gasket cage 15 for the piston rod 13. To enable the opening 27 to be sealed it is counterbored so as to form an annular groove 28 when the cap 14 is in position. A sealing-ring or gasket 30 is provided adapted to fit within the annular groove 28. The gaskets 26 and 30 are composed of a suitable resilient material such as rubber or synthetic compound, for example, and preferably are of the O-ring type in which the annular grooves for receiving them have an axial length somewhat greater than the axial depth, the uncompressed diameter of the gasket or sealing ring is greater than the annular groove receiving it, and the cross-section of the sealing ring is less than the cross-section of the annular groove receiving it, so that the sealing ring does not completely fill the groove but some rolling action is permitted when relative longitudinal motion takes place between the surfaces to be sealed.

It will be observed that leakage of hydraulic or pneumatic fluid around the piston rod 13 through the opening 27 in the gasket cage 15 is prevented by the seal provided by the sealing ring 30. Likewise leakage of fluid around the smaller diameter portion 23 of the gasket cage 15 along the inner surface of the cylinder 11 is prevented by the seal provided by the sealing ring 26. A readily fabricated and readily assembled construction is provided making it unnecessary to provide any grooves in either the cylinder 11 or the cylinder head 14 to receive gasketing material. Since the gasket cage 15 forms a separate removable unit, it may be formed without complicated machining operations and eliminates the necessity for complicated machining operations upon either the cylinder 11 or the cylinder head or cap 14. Nevertheless, these stationery parts are well secured and there is no looseness.

The apparatus illustrated in Fig. 1 is preferably assembled in the following manner:

With the cylinder 11 open, the piston 12 secured to the piston rod 13 may be inserted. Either before or after inserting the piston rod, the gasket cage 15 and the cap 14 are slipped over the piston rod 13 without however bringing the gasket cage 15 within the cylinder 11 or bringing the cap 14 over the open end of the cylinder 11, and without passing the cap 14 over the gasket cage 15. It will be understood that the sealing rings 26 and 28 have been snapped in place within the gasket cage 15 before it was passed over the piston rod 13. The gasket cage 15 is then moved into position with the small diameter portion 23 inserted in the end of the cylinder 11. The cap 14 is thereafter threaded into position for securing the cage 15.

It will be understood that a similar sealing arrangement may be employed for a closed cap which does not have a piston rod passing through it. For example, if the end 16 of the cylinder 11 were to be closed by a removable cap instead of being cast integral, a cap such as the cap 14 might be secured at the opposite end and in this case the gasket cage 15 would require only the single sealing ring 26 and no opening 27. Such an arrangement is illustrated, for example, in Fig. 2. Although in the arrangement of Fig. 1, I have shown a threaded connection between a cap 14 and the cylinder 11, it will be understood that my invention is not limited to the specific arrangement illustrated in Fig. 1 and other fastening means may be employed such as a spring-ring construction, for example, as illustrated in Figs. 2 and 3.

In the arrangement of Fig. 2 a closed cap or closure 31 is slipped over the open end of a cylinder 11 and secured thereto, and a gasket cage 32 is provided similar to the gasket cage 15 shown in Fig. 1, except that there is no opening and no internal seal therein. As in the arrangement of Fig. 1, there is a larger diameter portion 24 adapted to fit against the end of the cylinder 11 and within the cap 31. There is also a smaller diameter portion 23 adapted to fit within the cylinder 11, having an O-ring sealing construction including an annular groove 25 and a resilient sealing ring 26.

For securing the cap 31 to the cylinder 11 without the necessity for threading the confronting surfaces, a spring-ring 33 is provided and annular grooves are formed in the outer surface of the cylinder 11 and the inner surface of the cap 31 adapted to receive the spring-ring 33.

In the specific arrangement illustrated in Figs. 2 and 3, the annular groove 34 in the cylinder 11 is of substantially the same depth as the thickness of the spring-ring 33 so that the spring-ring 33 may be compressed wholly into the groove 34. There is an annular groove 35 in the specific arrangement illustrated cut in the inner-surface of the cap 31 of less depth than the thickness of the spring-ring 33. The spring-ring is formed with a permanent set such that it tends to spring outward to acquire a diameter as great or greater than that of the groove 35 in the cap 31. As illustrated in Fig. 3, it will be understood that the peripheral length of the spring-ring 33 is slightly less than the circumference of the annular groove 35 in order that the spring-ring 33 may be compressed into the groove 34 for purposes of assembly and dis-assembly of the cap 31 and the gasket cage 32. To facilitate dis-assembly a plurality of tool-receiving openings 36 spaced around the cap 31 are preferably provided, communicating with the groove 35 in the cap 31 for enabling the spring-ring 33 to be compressed for disengaging the groove 35.

In assembling the apparatus, the gasket cage 32 with the seal 26 inserted therein is first placed in position and the cap 31 is then placed at the end of the cylinder 11. Before the cap 31 has been slipped over the end of the cylinder 11 far enough to engage the spring-ring 33, the spring-ring 33 is held in the groove 34 in the cylinder 11 manually or by a suitable tool so as to permit the cap 31 to be slipped over the spring ring. As soon as the cap 31 has been pushed in into its intended position, the annular grooves 35 and 34 will have come into registry, and the spring-ring 33 is then permitted to spring outward partially filling the groove 35, still extending inwardly sufficiently to engage the edges of the groove 34 and thus hold the cap 31 in position on the cylinder 11. When dis-assembly is desired, a spanner or similar tool with prongs which may be caused to extend inwardly simultaneously through the openings 36 is used to compress the ring 33 out of engagement with the annular groove 35 in the cap 31, thus permitting the cap 31 to be slipped away again.

The gasket cage 15 may be composed of any suitable material. For example, it may be machined from bar stock or it may be moulded or die-cast from either plastic material or metal. In the arrangement of Fig. 1, the gasket cage 15 is formed as a single piece. However, my invention is not limited to the specific arrangement disclosed in Fig. 1. For example, if desired, a gasket cage may be fabricated or assembled from two or more pieces. As illustrated in Fig. 4, a gasket cage 15' is provided comprising two assembled parts 37 and 38, each counter-bored or recessed so as to form two annular slots 39 and 41 for receiving the inner and outer surface sealing rings 26 and 31 respectively.

In using this type of gasket cage construction, the cylinder 11 is preferably counter-bored as shown at 42 to provide a shoulder against which the gasket cage member 37 may fit. The outer edge of the part 37 is recessed so as to form the annular groove 39 and the part 38 is placed against the part 37. Likewise the inner surface of the part 38 is counter-bored so as to form the annular slot 41 when the part 38 is fitted against the part 37.

In assembling the apparatus of Fig. 4, the sealing rings 26 and 30 are placed in their positions in the parts 37 and 38, before the parts 37 and 38 are placed together. There is no necessity for stretching the ring 26. After the sealing ring 30 has been placed in the counter-bore of the part 38, the part 38 is placed against the part 37 thereby retaining both sealing rings 26 and 30. The cap 14 may then be screwed into position securing both parts 37 and 38.

Figs. 1 to 4 illustrate the adaptability of my sealing arrangement to either threaded or spring-ring fastened caps. However, the invention is not limited to the specific arrangements or the precise constructions shown in Figs. 1 to 4, inclusive. The sealing arrangement is also especially useful in connection with thin-walled tubing or thin-walled cylinders which are not only too thin to form gasket-receiving grooves, but also too thin for threading or forming grooves to receive a split ring. In the case of thin-walled cylinders, as illustrated in Figs. 5 and 6, for example, spring ring fastening is preferably employed for the cap, and a fixed shoulder lock is brazed, welded or otherwise secured, to the surface of the thin-walled cylinder. Although only a closed cap is illustrated, it will be understood that the fastening construction of Fig. 5 and Fig. 6 is applicable to either the closed cap or the type of cap having a piston rod passing therethrough. The type of seal may be similar to the seals shown in Figs. 1, 2 or 4, depending on requirements.

In the arrangement of Fig. 5 there is a thin-walled cylinder 43 illustrated as being sealed by a gasket cage 32, and a sealing ring 26 of the O-ring type as in Figs. 2 and 3. A cap 31 may be employed of the same type as illustrated in Figs. 2 and 3. As in Figs. 2 and 3 there is a spring-ring 33 which has been given a permanent set causing it to spring outward into the annular groove 35 in the cap 31. For holding the cap 31 in position, a fixed shoulder lock 44 is provided in the form of a band or ring, preferably composed of metal or other material capable of withstanding high compressive stress. It is secured or united to the thin wall 43 along the outer surface 45 thereof, preferably by some form of fusion such as brazing or welding. The ring or band forming the fixed shoulder lock 44 in Fig. 5 is preferably of substantially the same or slightly greater thickness than the spring-ring 33 in order that the ring 32 will be caused to clear the groove 35 when pressed inward. The cap 31 of Fig. 5 is dis-assembled by pressing the ring 33 inward by suitable tools inserted through openings 36 as described in connection with Figs. 2 and 3.

Although I have described an arrangement in which the permanent set of the spring-ring 35 is such as to cause it to spring outward, it will be understood that my invention is not limited thereto. For example, as illustrated in Fig. 6, I may employ a spring-ring 46 which has been given a permanent set causing it to tend to spring inward and to embrace the outer surface of the thin-walled cylinder 43. In the arrangement of Fig. 6, a cap 47 is provided having an annular slot 48 that is as great or slightly greater in depth than the thickness of the spring-ring 46. In order to increase the compactness of the construction, the fixed shoulder lock 49 is in this case preferably thinner than the spring-ring 46.

In order to provide for readily assembling the cap 37 with the thin-walled cylinder 43 without the necessity of a special provision for holding the spring-ring 46 outward during the assembly, the approaching end of the fixed shoulder lock 49 is preferably tapered or made conical to provide a ring expanding portion 51 which permits the cap and ring to be pushed into position. The construction of Fig. 6 provides somewhat more compactness than the construction of Fig. 5, and from this standpoint may be preferable in cases where dis-assembly of the cap 37 from the thin-walled cylinder 43 is not required. If the diameter of the outer portion of the gasket cage 32 is made greater than the outer diameter of the cylinder 43 as in Fig. 5 in order to provide increased bearing surface, the assembly of the cap 47 in Fig. 6 with the thin-walled cylinder is preferably accomplished by placing the gasket cage 32 within the cap 47 before the spring-ring 46 has been placed in the slot 48 preparatory to slipping the cap 47 into position over the end of the cylinder 43.

I have herein shown and particularly described certain embodiments of my invention and certain methods of operation embraced therein for the purpose of explaining its principle of operation, and showing its application, but it will be obvious to those skilled in the art that many modifications and variations are possible and I aim, therefore, to cover all such modifications and variations as fall within the scope of my invention which is defined in the appended claims.

What is claimed is:

1. A hydraulic actuator comprising in combination a cylinder open at one end to accommodate a piston rod, a centrally apertured gasket cage in the open end of the cylinder having a radial flange portion engaging the edge of the cylinder and a pilot portion extending within the cylinder and engaging the wall thereof, said pilot portion having an external groove and a fluid sealing ring in said groove, said cage having an axially outwardly facing counterbore surrounding the central aperture, and a centrally apertured end cap attached to said cylinder and engaging said cage to force the flange portion thereof against the cylinder end, said cap having a portion overlying and extensive with said counterbore and cooperating therewith to provide an internal groove for a fluid sealing ring, and a resilient sealing ring of rubber-like material in said groove for fluid sealing engagement with the piston rod.

2. A hydraulic actuator comprising in combination a cylinder open at one end to accommodate a piston rod, a centrally apertured gasket cage in the open end of the cylinder having a radial flange portion engaging the edge of the cylinder and a pilot portion extending within the cylinder and engaging the wall thereof, said pilot portion having an external groove and a fluid sealing ring in said groove, the axially inner wall of said flange portion forming the axially outer wall of said external groove, said cage having an axially outwardly facing counterbore surrounding the central aperture, and a centrally apertured end cap attached to said cylinder and engaging said cage to force the flange portion thereof against the cylinder end, said cap having a portion overlying and extensive with said counterbore and cooperating therewith to provide an internal groove for a fluid sealing ring, and a resilient fluid sealing ring of rubber-like material in said groove for fluid sealing engagement with the piston rod.

3. In combination, a thin-walled cylinder, a fixed shoulder lock united to the outer surface of said cylinder, a cap fitting over the end of said cylinder, a gasket cage held in position in the open end of said cylinder by said cap, a gasket ring held against the inner surface at the outer end of said cylinder by said gasket cage, and a spring-ring secured in said cap and bearing against said fixed shoulder lock for securing said cap to said cylinder.

4. In combination, a thin-walled cylinder, a fixed shoulder lock united to said cylinder at the outer surface thereof near the open end thereof, a cap fitting over the open end of the cylinder, sealing means for the open end of the cylinder held in position by said cap, and a spring ring secured in said cap and bearing against said fixed shoulder lock for securing said cap to said cylinder.

5. In combination, a thin-walled cylinder, a fixed shoulder lock comprising a band surrounding the cylinder, and united to the outer surface thereof, adjacent an end thereof, a cap surrounding said cylinder and fixed shoulder lock, and a spring-ring, said cap having an annular slot at the inner surface thereof of less depth than the thickness of said spring ring, and positioned for causing the spring-ring to bear against the fixed shoulder lock ring, and said lock band having substantially as great thickness as the thickness of the spring-ring, said spring-ring having a permanent set tending to cause it to spring outward into said annular slot in the cap.

6. A cylinder having a wall of such thinness as to preclude slotting for receiving a spring-ring, and a fixed shoulder lock united to the surface of said cylinder, a spring-ring adapted to bear against said fixed shoulder lock, and a cap having a slot therein adapted to receive a spring-ring, and positioned to cause the spring-ring to bear against the fixed shoulder lock for securing said cap to said cylinder, said slot having a depth substantially as great as the thickness of the spring-ring and the spring-ring having permanent set tending to cause it to spring out of said slot against said cylinder, said fixed shoulder lock having a thickness less than the thickness of the spring-ring.

7. In combination, a cylinder, a spring-ring having a permanent set tending to cause it to embrace said cylinder resiliently, a fixed shoulder lock comprising a ring of less thickness than said spring-ring united to the outer surface of said cylinder, and a cap having an internal diameter as great as the outer diameter of said shoulder lock ring and having an annular slot substantially as deep as the thickness of said spring-ring, adapted to receive said spring-ring for securing said cap to said cylinder.

8. Apparatus as in claim 7 wherein the shoulder lock ring is tapered at the end thereof toward the end of said cylinder for expanding the lock ring to facilitate assembly of the cap with the cylinder.

FRANK J. RAYBOULD.

REFERENCES CITED

The following references are of record in the file of this patent:

UNITED STATES PATENTS

| Number | Name | Date |
|---|---|---|
| 584,592 | Johnson | June 15, 1897 |
| 797,066 | Marsden | Aug. 15, 1905 |
| 1,460,419 | Joyce | July 3, 1923 |
| 1,460,420 | Joyce | July 3, 1923 |
| 1,678,946 | Joyce | July 31, 1928 |
| 1,780,764 | Noble | Nov. 4, 1930 |
| 1,872,516 | Skinner | Aug. 16, 1932 |
| 1,953,184 | McVeigh | Apr. 3, 1934 |
| 2,230,286 | Cotner | Feb. 4, 1941 |
| 2,340,817 | Hurst | Feb. 1, 1944 |
| 2,349,170 | Jackman | May 16, 1944 |
| 2,360,535 | Ashton | Oct. 17, 1944 |
| 2,390,445 | Mercier | Dec. 4, 1945 |
| 2,410,808 | Christensen | Nov. 12, 1946 |